United States Patent [19]

Miyasaka

[11] 4,425,522

[45] Jan. 10, 1984

[54] ROTATIONAL SPEED INDICATION SIGNAL GENERATOR HAVING A PLURALITY OF GENERATING COILS

[75] Inventor: Takao Miyasaka, Yokohama, Japan

[73] Assignee: Victor Company of Japan, Limited, Yokohama, Japan

[21] Appl. No.: 333,271

[22] Filed: Dec. 22, 1981

[30] Foreign Application Priority Data

Dec. 22, 1980 [JP] Japan .................. 55-184457[U]

[51] Int. Cl.$^3$ .................................. H02K 11/00
[52] U.S. Cl. ............................ 310/268; 310/188; 310/269; 324/173
[58] Field of Search ............. 310/68 R, 168, 185–188, 310/198, 268, 269, 83, 153; 324/173, 174, 172, 208

[56] References Cited

U.S. PATENT DOCUMENTS

| | | | |
|---|---|---|---|
| 3,339,097 | 8/1967 | Dunn | 310/269 |
| 3,777,196 | 12/1973 | Field | 310/156 |
| 3,967,200 | 6/1976 | Tetsugu et al. | 324/173 |
| 4,117,519 | 9/1978 | Shioyama et al. | 360/84 |
| 4,125,792 | 11/1978 | Schmider | 310/268 |
| 4,366,405 | 12/1982 | Schmider | 310/268 |

Primary Examiner—J. D. Miller
Assistant Examiner—D. L. Rebsch
Attorney, Agent, or Firm—Lowe, King, Price & Becker

[57] ABSTRACT

A rotational speed indication signal generator comprises a magnetic circuit and a plurality of generating coils radially arranged with respect to the rotary shaft of a rotor. Each of the generating coils is wound around a radial projection of a circular disk made of a magnetic material so that the axis of the generating coils is normal to the rotary shaft. The generating coils are electrically connected in series in such a manner that a noise voltage induced across one coil caused by external flux has opposite polarity to that of a noise voltage induced across another coil positioned opposite with respect to the rotary shaft. The electrical connection of the generating coils has a given circular direction while a lead wire connected to the last coil in the series connection has a circular direction opposite to the direction of the series connection.

11 Claims, 6 Drawing Figures

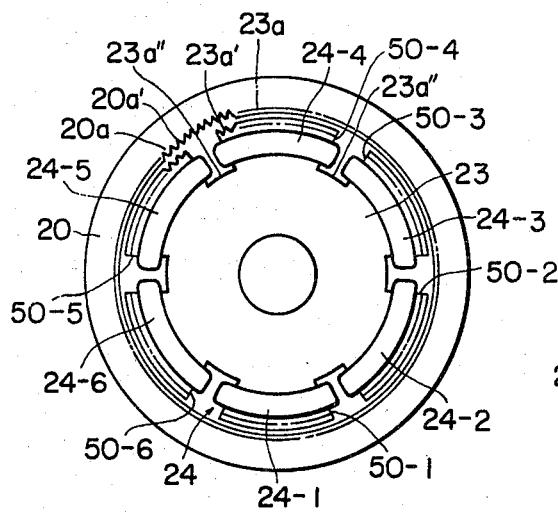
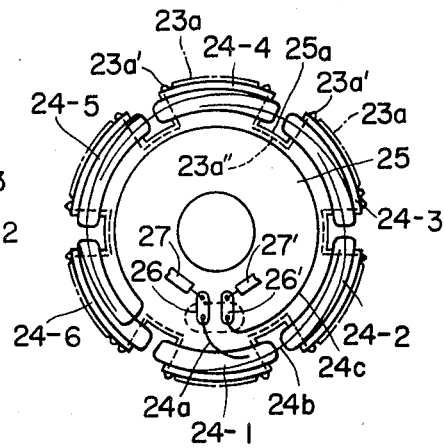
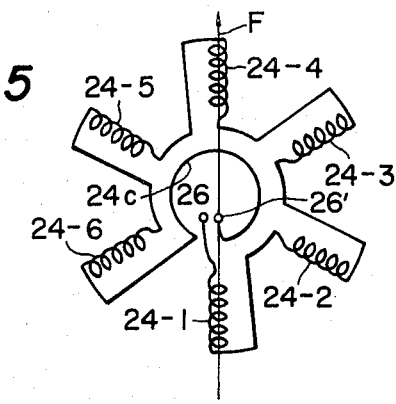
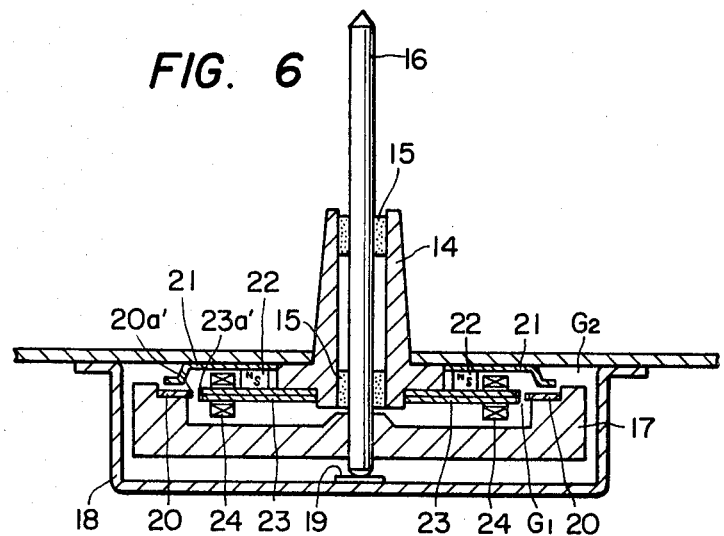

ROTATIONAL SPEED INDICATION SIGNAL GENERATOR HAVING A PLURALITY OF GENERATING COILS

BACKGROUND OF THE INVENTION

This invention relates to a generator which generates an output signal indicative of the rotational speed of a rotating body, such as the shaft of an electric motor, in order to control the rotational speed of the rotating body with a feedback circuit.

Various types of generators or rotational speed detectors or sensors have been known, and in electric motors for driving the capstan of a tape recorder, a rotational speed indication signal generator of the type arranged to produce an output signal by electromagnetic induction is known. Such a conventional generator comprises a rotor and a stator which constitute a magnetic circuit having a permanent magnet, and a coil which generates an output signal as the rotor rotates by detecting the change in magnetic flux passing therethrough. This conventional generator, however, is apt to be influenced by external leakage flux which comes from the motor, in which the generator is built, a power transformer, and an electromagnetic plunger or the like which are disposed in the vicinity of the motor. Namely, the generating coil of the generator is apt to pick up leakage flux from (a) magnetic circuit(s) other than that of the generator, so that undesirable output signal results.

Therefore, such a conventional rotational speed indication signal generator is not suitable for a motor whose rotational speed is relatively low because signal voltage induced during low speed rotation is relative low, resulting in low S/N of the output signal.

According to a conventional technique, another coil is provided for removing the undesirable electrical output caused by external leakage flux. Namely, a second coil is axially spaced from the generating coil of the generator so that a second coil does not interlink with the flux passing through the magnetic circuit of the generator, and the other coil is electrically connected to the generating coil so that the undesirable electrical signal induced across the generating coil is cancelled or offset. Although such a generator having a compensating coil is practically used, its structure is complex, and the manufacturing cost is high. Furthermore, the undesirable influence due to leakage flux cannot be perfectly removed with such a compensating coil.

SUMMARY OF THE INVENTION

The present invention has been achieved in order to remove the above-mentioned disadvantages and drawbacks inherent to the conventional rotational speed indication signal generators.

It is, therefore, an object of the present invention to provide a new and useful rotational speed indication signal generator which does not produce an undesirable output signal even if the generating coils thereof are exposed to external leakage flux.

According to a feature of the present invention, a plurality of generating coils which are electrically connected in series are radially provided with respect to a rotary shaft, where each of the coils is wound around an axis which radially extends from the rotary shaft. The plurality of generating coils are electrically connected so as to form a clockwise or counterclockwise connection with respect to the rotary shaft. Thus a voltage induced across one coil in response to flux having a direction normal to the rotary shaft, is opposite to a voltage induced in response to the same flux across another coil positioned opposite with respect to the rotary shaft so that resultant voltage substantially equals zero. A lead wire connected between a terminal and one end of the last generating coil in the series connection is disposed in such a manner that the lead wire constitutes a single turn of a winding whose direction is opposite to the direction of the circular series connection of the generating coils.

In accordance with the present invention, there is provided a rotational speed indication signal generator, comprising: a base plate; a rotary shaft mounted rotatably with respect to said base plate; an outer disk made of a magnetic material and coaxially arranged with respect to said rotary shaft, said outer disk having gear teeth along its inner periphery; an inner disk made of a magnetic material, said inner disk having gear teeth at its outer periphery so that said gear teeth of said outer disk surround and face said gear teeth of said inner disk with an annular air gap between said outer and inner disks, one of said outer and inner disks having a plurality of slots radially extending for defining a plurality of radial projections, one of said outer and inner disks being stationary with respect to said base plate, the other of said outer and inner disks being stationary with respect to said rotary shaft; a permanent magnet attached to said outer or inner disk for constituting a magnetic circuit together with said outer and inner disks; and a plurality of generating coils each wound around each of said radial projections in such a manner that the axis of each of said generating coils is normal to said rotary shaft.

BRIEF DESCRIPTION OF THE DRAWINGS

The object and features of the present invention will become more readily apparent from the following detailed description of the preferred embodiments taken in conjunction with the accompanying drawings in which:

FIG. 3 is top plan view of the magnetic circuit of the generator of FIG. 2;

FIG. 4 is a top plan view of the rotor of FIG. 2, showing the way of electrical connection between generating coils;

FIG. 5 is an equivalent circuit diagram of the coil assembly of FIGS. 2 to 4; and FIG. 6 is a schematic cross-sectional view of a second embodiment of the rotational speed indication signal generator according to the present invention.

The same or corresponding elements and parts are designated at like numerals throughout the drawings.

DETAILED DESCRIPTION OF THE INVENTION

Prior to describing the preferred embodiments of the present invention, the above-mentioned conventional rotational speed indication signal generator will be described for better understanding of the present invention.

Figure 1:
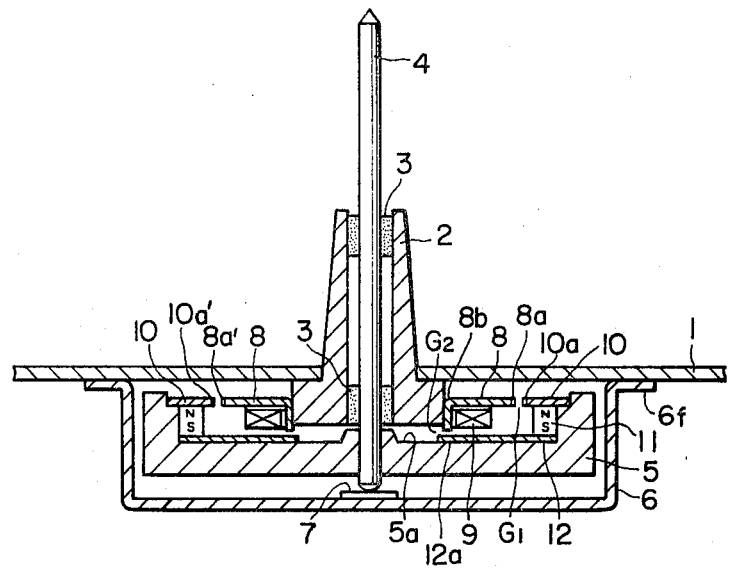
FIG. 1 is a cross-sectional view of a conventional rotational speed indication signal generator having a single generating coil arranged coaxially with respect to the center of the rotor.

FIG. 1 shows a cross-sectional view of the aforementioned conventional rotational speed indication signal generator which is incorporated into an electrical motor (not shown) for driving a capstan of a tape recorder, VCR or the like. Since the present invention is related to a rotational speed indication signal generating portion, description of the electrical motor portion is omitted.

The reference numeral 1 is a base plate; 2, a bearing supporter fixedly attached to the base plate 1; 3, a bearing supported by the bearing supporter 2; and 4, a rotary shaft rotatably received in the bearing 3. The rotary shaft 4 is the shaft of the unshown electrical motor, and the upper portion of the rotary shaft 4 functions as a capstan which drives a magnetic recording tape (not shown). The reference numeral 5 is a flywheel fixed to the lower portion of the shaft 4, and the reference 6 is a thrust bearing supporting member which supports a thrust bearing 7. The thrust bearing supporting member 6 has a flange portion 6f at its periphery, and is attached to the lower surface of the base plate 1 at the flange portion 6f.

The reference numeral 8 is an annular magnetic disk having a plurality of teeth-like concavo-convex portions 8a' along its circumference 8a, where the teeth are equidistantly or equiangularly spaced. The annular magnetic disk 8 is fixed at its inner periphery 8b to the outer periphery of the bearing supporter 2. The inner periphery 8b of the annular magnetic disk 8 constitutes a cylindrical portion extending axially, and an annular generating coil 9 is wound around the cylindrical portion 8b. The reference numeral 10 is an annular magnetic disk fixedly connected to the above-mentioned flywheel 5 in such a manner that the annular magnetic disk 10 surrounds the annular magnetic disk 8. The annular magnetic disk 10 comprises, at its inner periphery, teeth-like concavo-convex portions 10a' whose shape is similar to that of the above-mentioned teeth-like concavo-convex portions 8a' so that the teeth-like concavo-convex portions 10a' face the other teeth-like concavo-convex portions 8a' having a given air gap G1 therebetween. The reference numeral 11 is a permanent magnet fixed to the flywheel 5 in such a manner that the permanent magnet 11 is interposed between a magnetic plate 12 which is placed on a radially extending horizontal flat portion 5a of the flywheel 5 and the above-mentioned annular magnetic disk 10. The N and S poles of the permanent magnet 11 are arranged in a direction parallel to the axis of the rotary shaft 4. The magnetic plate 12 has an inner periphery 12a which faces the inner periphery 8b of the fixed magnetic disk 8 having a given air gap G2 therebetween.

Accordingly, the rotational speed indication signal generator comprises a magnetic circuit whose path is as the N pole of the permanent magnet 11—the annular magnetic disk 10—the air gap G1—the magnetic disk 8—the air gap G2—the magnetic plate 12—the S pole of the permanent magnet 11.

The rotational speed indication signal generator of FIG. 1 operates as follows. When the annular magnetic disk 10 attached to the rotor is stationary, the magnetic flux passing through the generating coil 9 is D.C.-like, namely, the flux does not vary, and therefore, no electrical signal is induced across the generating coil 9. In the case that the rotary shaft 4 rotates together with the flywheel 5, the concavo-convex portions 8a' of the magnetic disk 8 which face the other concavo-convex portions 10a' via the air gap G1 move relative to the teeth-like concavo-convex portions 10a'. When the convex portions of these concavo-convex portions 8a' and 10a' face each other, the reluctance at the air gap G1 becomes small; when the concave portions face the convex portions, the reluctance at the air gap G1 becomes great. Therefore, the magnetic flux passing through the magnetic circuit, namely, passing through the generating coil 9, varies, and therefore, an A.C. electrical signal is induced across the generating coil 9 where the A.C. electrical signal varies in accordance with the pitch of the teeth-like concavo-convex portions 8a' and 10a' formed on the magnetic disks 8 and 10. This electrical signal will be used to control the rotational speed of the rotary shaft 4.

The A.C. electrical signal will be processed to take a form of a pulse train signal, and in the conventional example, the number of pulses per revolution of the rotary shaft 4 can be increased as far as the machining limit of the teeth-like concavo-convex portions 8a' and 10a' formed on the magnetic disks 8 and 10. Since the relative movement of the concavo-convex portions 8a' and 10a' occurs along the entire circle of the air gap G1, the generated electrical signal is difficult to vary irrespective of the vibrations of the inner periphery 10a of the magnetic disk 10 attached to the rotor, and this conventional generator has an advantage that the size therefor is relatively small. However, when it is intended to increase the number of pulses per revolution of the rotary shaft 4, it is necessary to make the diameter of the magnetic disks 8 and 10 large. The diameter of the generating coil 9 is also necessarily increased according to the increase in the diameter of the magnetic disk 8. A larger diameter generating coil is apt to pick up noises due to external flux from the magnetic circuits of the motor in which the rotational speed indication signal generator is built or other magnetic circuits, such as a power transformer, electromagnetic plungers or the like, located close to the rotational speed indication signal generator as described at the beginning of this specification.

Figure 2:
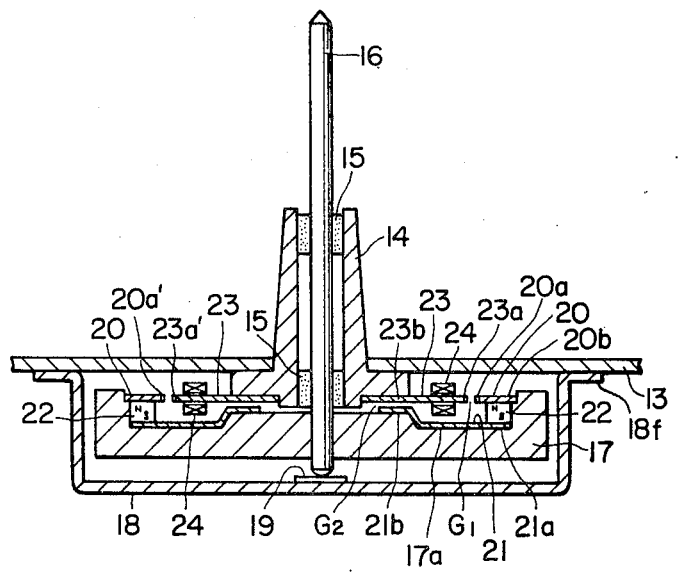
FIG. 2 is a schematic cross-sectional view of a first embodiment of the rotational speed indication signal generator according to the present invention.

Reference is now made to FIG. 2 which shows a cross-sectional view of a first embodiment of the rotational speed indication signal generator according to the present invention. The reference 13 is a base plate; 14, a bearing supporter fixedly attached to the base plate 13; 15, a bearing supported by the bearing supporter 14; and 16, a rotary shaft rotatably received in the bearing 15. The rotary shaft 16 is the shaft of the electrical motor (not shown), and the upper portion of the rotary shaft 16 functions as a capstan which drives a magnetic recording tape (not shown). The reference numeral 17 is a flywheel fixed to the lower portion of the shaft 16, and the reference 18 is a thrust bearing supporting member which supports a thrust bearing 19. The thrust bearing supporting member 18 has a flange portion 18f at its periphery, and is attached to the lower surface of the base plate 13 at the flange portion 18f. The reference numeral 20 is an annular magnetic disk fixedly attached to the above-mentioned flywheel 17 in such a manner that a permanent magnet 22 is interposed between the annular magnetic disk 20 and a magnetic plate 21. The N and S poles of the permanent magnet 22 are arranged in a direction parallel to the axis of the rotary shaft 16. The annular magnetic disk 20, which will be referred to as a rotary magnetic disk, comprises, at its inner periphery 20a, teeth-like concavo-convex portions 20a'.

The above-described arrangement of the rotational speed indication signal generator of FIG. 2 is substantially the same as that of the conventional generator of FIG. 1. The first embodiment of FIG. 2 is different from the conventional arrangement as follows. The generator of FIG. 2 comprises an annular or circular disk 23 made of a magnetic material, which is fixedly connected to the lower portion of the bearing supporter 14 in such a manner that the annular disk 23 is coaxial with the rotary shaft 16. The annular disk 23, which will be referred to as a stationary disk, has teeth-like concavo-convex portions 23a' along its outer periphery 23a. As seen in a partial top plan view of FIG. 3, a plurality of radial slots 23a'' are formed in the stationary disk 23 so as to define a plurality of radial projections 50-1 to 50-6. Namely, the teeth-like concavo-convex portions 23a' are formed at the tip portion of each of the radial projections 50-1 to 50-6. A plurality of generating coils 24 (24-1 to 24-6) are respectively wound around the radial projections 50-1 to 50-6 so that each of the projections 50-1 to 50-6 functions as a core of the corresponding coil. Therefore, the generating coils 24-1 to 24-6 are radially arranged with respect to the center of the stationary disk 23, therefore, with respect to the rotary shaft 16, in such a manner that the axis of each generating coil 24 is normal to the rotary shaft 16 as shown in FIG. 2. The stationary disk 23 is positioned so that the teeth-like concavo-convex portions 23a' thereof face the teeth-like concavo-convex portions 20a' of the rotary disk 20 attached to the flywheel 17. Namely, the stationary disk 23 is surrounded by the annular rotary disk 20, where the teeth of the stationary disk 23 and the teeth of the rotary disk 20 are spaced so as to define an annular air gap G1 therebetween. The stationary disk 23 is arranged to face, at its inside portion 23b, the inside portion 21b of the magnetic plate 21, having an air gap G2 therebetween, where the magnetic plate 21 is positioned on a horizontal flat portion 17a of the flywheel 17. Therefore, the stationary and rotary disks 20 and 23, the permanent magnet 22 and the magnetic plate 21 constitute a magnetic circuit having the air gaps G1 and G2. The path of the magnetic circuit of the first embodiment generator is as the N pole of the permanent magnet 22—the rotary disk 20—the air gap G1—the stationary disk 23—the air gap G2—the magnetic plate 21—the S pole of the permanent magnet 22.

FIG. 4 shows detailed arrangement of the stationary disk 23 equipped with the generating coils 24-1 to 24-6. The stationary disk 23 is sandwiched between a pair of insulating plates 25 (only upper one is shown in the top plan view of FIG. 4). The insulating plates 25 have a diameter which is slightly smaller than that of the stationary disk 23, and U-shaped slots 25a corresponding to the slots 23a'' of the stationary disk 23. The width and depth of each of the slots 25a of the insulating plates 25 are both slightly smaller than those of each slot 23a'' of the stationary disk 23 (see dotted lines indicating the slots 23a'').

Two terminals 26 and 26' are attached to one of the insulating plates 25 as shown in FIG. 4, and lead wires 27 and 27' are electrically and mechanically connected to the terminals 26 and 26' respectively. The generating coils 24-1 to 24-6 are electrically connected in series to form a coil assembly, and both ends of the series connection will be connected to the terminals 26 and 26'. In detail, the first terminal 26 is connected to a wind-staring end or lead of the first coil 24-1 in the series connection, while a wind-terminating end of the first coil 24-1 is electrically connected via a connecting wire 24b to a wind-starting end of the second coil 24-2 which is located next to the first coil 24-1. In this way, the generating coils 24-1 to 24-6 are connected in series one after another along a circular direction (counterclockwise in FIG. 4). A wind-terminating end or lead 24c of the last coil 24-6 in the series connection is connected to the second terminal 26' in such manner that the lead 24c is circularly positioned on the insulating plate 25 with respect to the rotary shaft 16. The circularly positioned lead wire 24c forms a substantial single turn of a winding whose diameter is substantially the same as that of the coil assembly, and the circular direction of the lead wire 24c from the last coil 24-6 toward the second terminal 26 is clockwise. In other words, the circular direction toward the second terminal 26' is opposite to the circular direction of the series connection.

FIG. 5 illustrates a schematic circuit diagram showing the electrical connection between the generating coils 24-1 to 25-6. In the embodiment of FIGS. 1 to 5, the number of the generating coils 24-1 to 24-6 is six, where the generating coils 24-1 to 24-6 are equidistantly or equiangularly arranged. Suppose magnetic flux indicated by an arrow F is applied to the coil assembly in a direction of the axis of the first and fourth coils 24-1 and 24-4 which are opposite to each other with respect to the rotary shaft 16, a voltage induced across the first coil 24-1 is added to a voltage induced across the fourth coil 24-4, where the polarities of these voltages are opposite to each other. Namely, the voltages respectively induced across the first and fourth coils 24-1 and 24-4 are offset. Similarly, voltages induced across the second and fifth coils 24-2 and 24-5 are cancelled, while voltages induced across the third and sixth coils 24-3 and 24-6 are cancelled. Accordingly, the resultant voltage developed across the terminals 26 and 26' by the variation in density in flux, whose direction is parallel to plane of the axes of the generating coils 24-1 to 24-6, is substantially zero.

Let us assume that magnetic flux is applied to the coil assembly in a direction of the rotary shaft 16, namely in a direction normal to the plane of the coil axes. Since the coil assembly has six generating coils 24-1 to 24-6 which are connected in series along the circumference of the stationary disk 23, the series connection of the coils 24-1 to 24-6 per se functions as a single turn responsive to such flux, inducing a low voltage accordingly. However, the circularly arranged lead wire 24c between the last coil 24-6 and the second terminal 26' is also responsive to the flux so as to develop a voltage whose polarity is opposite to the voltage induced across the series connection of the coils 24-1 to 24-6, because the turning direction of the lead wire 24c is opposite to that of the series connection. These two voltages are added to each other to be cancelled. As a result, substantially zero volt is developed across the terminals 26 and 26' in response to such flux applied to the coil assembly in a direction of the rotary shaft 16.

From the above, it will be understood that the coil assembly used in the present invention does not produce noise voltages across its terminals in response to external magnetic flux because voltages developed in the generating coils 24-1 to 24-6 are offset as described in the above. As the rotor of the generator rotates, the reluctance between the concavo-convex portions or gearteeth 23a' of the stationary disk 23 and the concavo-convex portions or gear teeth 20a' of the rotary disk 20 changes to cause each generating coils 24-1 to 24-6 to develop an A.C. voltage whose frequency is porportional to the rotational speed of the rotor. The voltages induced across respective coils 24-1 to 24-6 are added in series so that a resultant higher voltage will be developed across the terminals 26 and 26'. The A.C. voltage across the terminals 26 and 26' will be processed in a pulse shaping circuit (not shown) to produce a pulse train signal indicative of the rotational speed.

FIG. 6 shows a second embodiment of the present invention. The second embodiment differs from the above-described first embodiment in that the permanent magnet 22 is attached to the stationary disk 23 in such manner that the permanent magnet 22 is sandwiched between the stationary disk 23 and a magnetic plate 21 which is also stationary, and in that the stationary disk 23 comprises laminated structure. In detail, the permanent magnet 22 is positioned inside the generating coils 24-1 to 24-6, on the stationary disk 23, while the magnetic plate 21 is radially extending to have a gap G2 with respect to the rotary disk 20. From the above, it will be understood that the permanent magnet 22 may be attached to either of the rotary and stationary disks 20 and 23.

Generally speaking, when it is intended to form a number of gear teeth along the inner or outer periphery of a circular or annular disk, it is easier to machine a thinner magnetic plate. However, if both the stationary and rotary disks 23 and 20 are very thin, it is difficult to keep aligment at the air gap G1. Namely, when the plane of the rotary disk 20 waves or fluctuates during revolution, the teeth 20a' of the rotary disk 20 are apt to deviate from the plane of the stationary disk 23 resulting in substantial change in the facing area of the teeth 20a'. This phenomenon will result in induction of an undesirable voltage having a frequency corresponding to the period of the fluctuation.

In the second embodiment of FIG. 6, therefore, the stationary disk 23 has a thickness which is greater than that of the rotary disk 20, so that the teeth 20a' of the rotary disk 20 are difficult to deviate from the plane of the stationary disk 23. To this end, the stationary disk 23 is constructed of a plurality of magnetic disks. In this embodiment, two laminated disk-like plates are used, and the number of laminated plates may be increased if desired. Although the stationary disk 23 has laminated structure in the illustrated embodiment, the rotary disk 20 may be of laminated structure while the stationary disk 23 comprises a single magnetic plate. In other words, the laminated structure may be adapted to one of the rotary and stationary disks 20 and 23 so that substantial facing area between teeth 20a' and 23a' of the rotary and stationary disks 20 and 23 is insured.

The rotational speed indication signal generator according to the present invention has an advantage, in addition to the above-mentioned various advantages, that the generator is relatively small in size compared to the conventional example of FIG. 1. Namely, since the coil assembly in the present invention comprises a plurality of radially arranged coils, there is no need to provide a space for a bulky concentrated coil axially wound with respect to the rotary shaft as shown in FIG. 1. In other words, since the concentrated coil 8 of FIG. 1 is divided into a plurality of coils 24-1 to 24-6 as shown in FIGS. 2 to 6 in the present invention, the generator occupies less space in the axial direction of the rotary shaft 16. Such reduction in size will provide a lower cost of the generator, while it is advantageous to build such a small generator in an electrical motor in view of space limit.

While in the embodiments of the generator according to the present invention this been described that teeth 20a' of the rotary disk 20 are arranged to surround the teeth 23a' of the stationary disk 23, this arrangement may be reversed. Namely, the disk 23 may be attached to the rotary shaft 23, while the other disk 20 may be made stationary.

Although the embodiments of the present invention have been described in connection with a generator to be built in or incorporated with an electrical motor, the generator according to the present invention may be adapted to any kind of rotating bodies. For instance, the generator may function as a tachometer generator which produces an output signal indicative of the rotational speed of various rotating bodies. In order to measure the rotational speed of an external rotating body, the tip portion of the rotary shaft 16 of the generator may be pressed toward the end of a rotary shaft of the rotating body to be measured.

The above-described embodiments are just examples of the present invention, and therefore, it will be apparent for those skilled in the art that many modifications and variations may be made without departing from the spirit of the present invention.

What is claimed is:

1. A rotational speed indication signal generator, comprising:
    (a) a base plate;
    (b) a rotary shaft mounted rotatably with respect to said base plate, said rotary shaft being arranged to be driven by an external rotational force applied thereto;
    (c) an outer disk made of a magnetic material and coaxially arranged with respect to said rotary shaft, said outer disk having gear teeth along its inner periphery;
    (d) an inner disk made of a magnetic material, said inner disk having gear teeth at its outer periphery so that said gear teeth of said outer disk surround and face said gear teeth of said inner disk with an annular gap between said outer and inner disks, said inner disk having a plurality of slots radially extending for defining a plurality of equiangularly spaced apart integral radial projections, angles between successive projections being less than 180°, one of said outer and inner disks being stationary with respect to said base plate, the other of said outer and inner disks being stationary with respect to said rotary shaft;
    (e) a permanent magnet attached to said outer or inner disk for constituting a magnetic circuit together with said outer and inner disks; and
    (f) a plurality of generating coils wound respectively around said radial projections in such a manner that the axis of each of said generating coils is normal to said rotary shaft so that said generating coils are radially arranged and lie along axes in a common plane angles between successive axes being less than 180° said generating coils being electrically connected in series so that resultant sum voltage caused from a component of ambient magnetic flux at any angle parallel to the plane of said inner disk equals zero.

2. A rotational speed indication signal generator, as claimed in claim 1, wherein said generating coils are electrically connected to form a coil assembly in such a manner that resultant induced voltage across the terminals of said coil assembly is substantially zero when ambient magnetic flux, which is applied to said coil assembly in a direction normal to said rotary shaft, varies.

3. A rotational speed indication signal generator, as claimed in claim 1 or 2, wherein said generating coils are electrically connected in series in a direction along the circumference of said inner disk, one after another.

4. A rotational speed indication signal generator, as claimed in claim 3, further comprising first and second terminals, and first and second lead wires, said first lead wire being connected between said first terminal and the coil end of the first coil located at the beginning of the series connection, said second lead wire being connected between said second terminal and the coil end of the last coil located at the end of said series connection, said first to last coils being connected electrically along a circular direction, said second lead wire being circularly positioned in a plane parallel to said inner disk so as to form a substantial single turn whose diameter is substantially the same as that of said coil assembly, the circular direction of said second lead wire from said last coil toward said second terminal is opposite to said circular direction of the series connection.

5. A rotational speed indication signal generator, as claimed in claim 4, wherein said first and second terminals are positioned in the vicinity of said first coil.

6. A rotational speed indication signal generator, as claimed in claim 1, wherein one of said outer disk and said inner disk is thicker than the other.

7. A rotational speed indication signal generator, as claimed in claim 6, wherein said outer disk comprises laminated structure.

8. A rotational speed indication signal generator, as claimed in claim 6, wherein said inner disk comprises laminated structure.

9. A rotational speed indication signal generator, as claimed in claim 1, wherein said inner disk is stationary with respect to said rotary shaft, while said outer disk is stationary with respect to said rotary shaft.

10. A rotational speed indication signal generator, as claimed in claim 1, wherein said outer disk is stationary with respect to said rotary shaft, while said inner disk is stationary with respect to said rotary shaft.

11. A rotational speed indication signal generator, as claimed in claim 1, wherein each of said slots has a tangential length which is much smaller than the tangential length of said projections.

* * * * *